Sept. 11, 1928.
E. G. OAKLEY
1,684,194
METHOD OF MAKING TIRE VALVE STEMS AND THE LIKE
Filed March 12, 1923   3 Sheets-Sheet 1
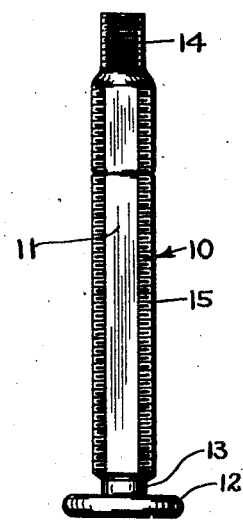
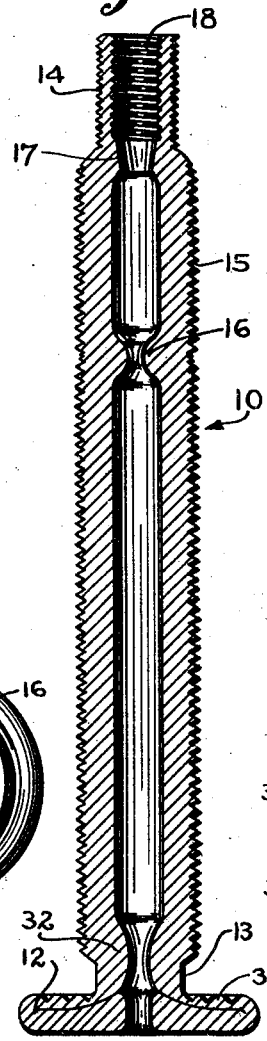
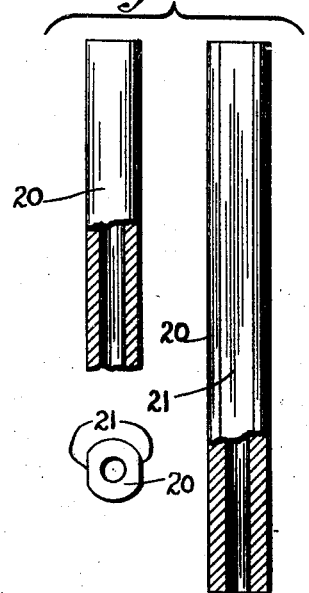
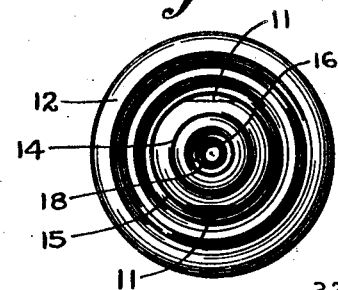
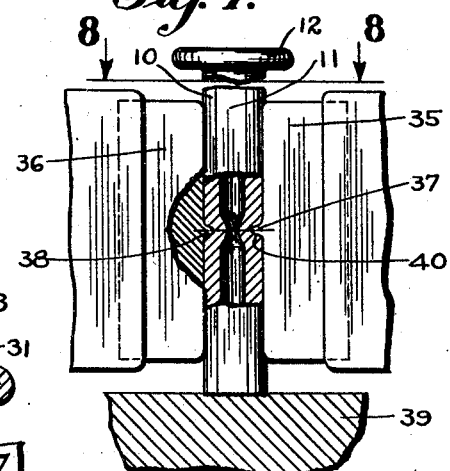
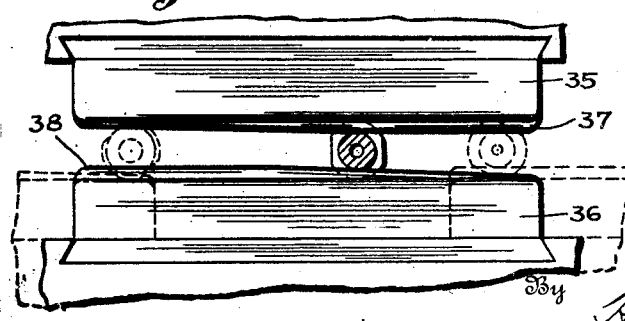
Inventor
Erastus G. Oakley
By Henry E. Rockwell
Attorney Sept. 11, 1928.
E. G. OAKLEY
1,684,194
METHOD OF MAKING TIRE VALVE STEMS AND THE LIKE
Filed March 12, 1923   3 Sheets-Sheet 2
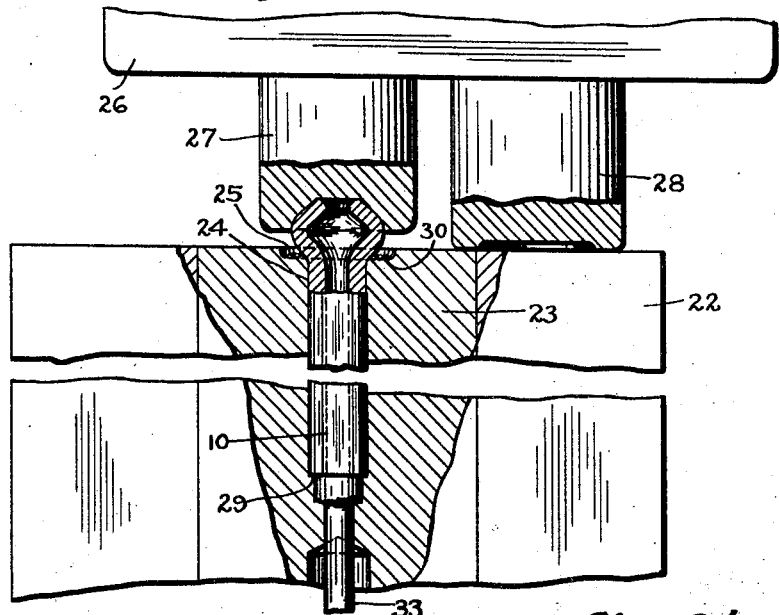
Fig. 5.
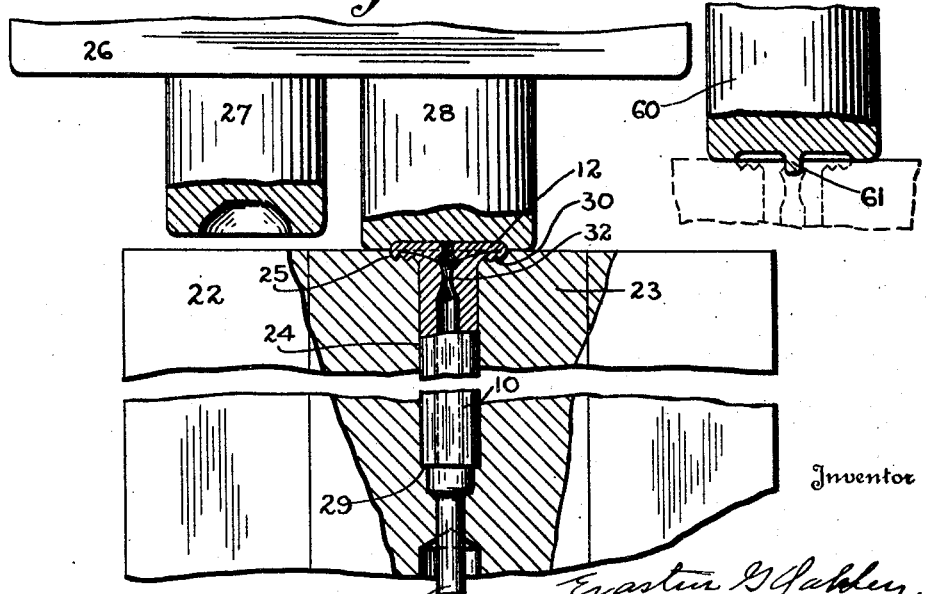
Fig. 6.   Fig. 6ᴬ
Inventor
Erastus G. Oakley
By Henry E. Rockwell
Attorney Sept. 11, 1928.  1,684,194
E. G. OAKLEY
METHOD OF MAKING TIRE VALVE STEMS AND THE LIKE
Filed March 12, 1923  3 Sheets-Sheet 3
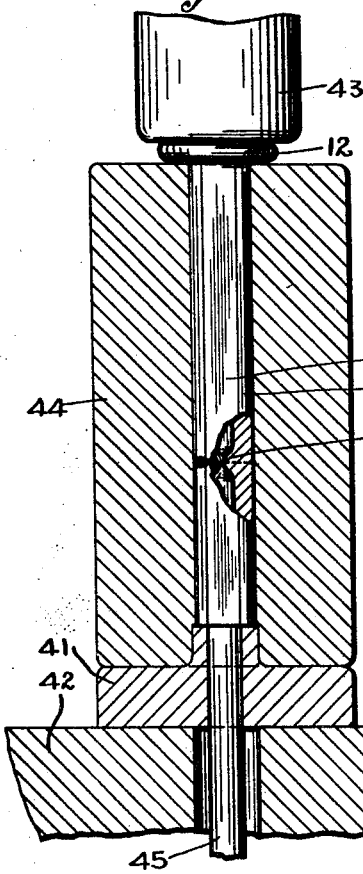
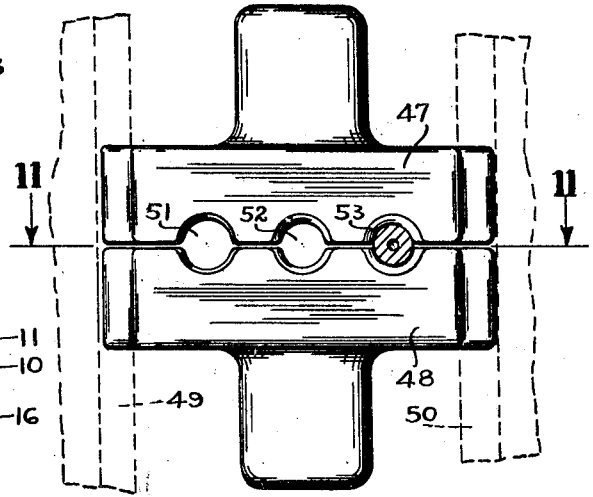
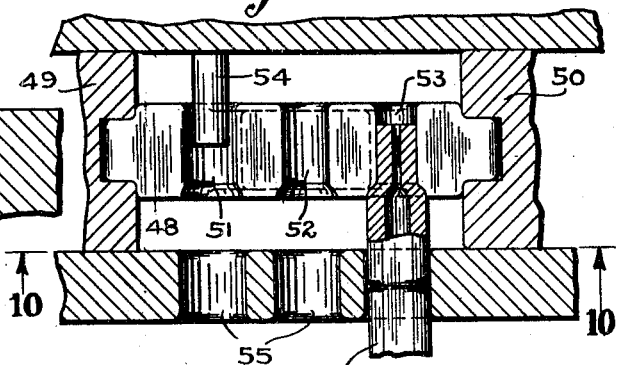
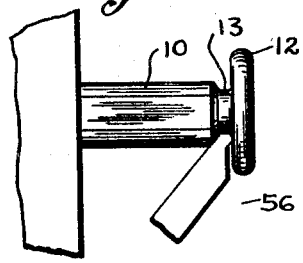
Inventor
Erastus G. Oakley
By Henry E. Rockwell
Attorney Patented Sept. 11, 1928.

1,684,194

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

METHOD OF MAKING TIRE-VALVE STEMS AND THE LIKE.

Application filed March 12, 1923. Serial No. 624,532.

This invention relates to the manufacture of so-called valve stems or casings, and more particularly to a valve stem designed for use with pneumatic tires, the invention being particularly concerned with the tube or casing in which the valve proper is mounted. In the past, such stems or casings have been manufactured from a piece of solid bar stock. After such a blank has been headed to provide the broad disc-like base, commonly formed upon one end of the stem, usually the next operation is to drill an opening through the entire length of the blank, in order to provide for the admission of air to the tire, after the stem has been connected therewith. For various reasons, a valve stem made by this prior method possesses certain inherent defects and disadvantages, among which are lack of tensile strength, a weak point of connection between the body of the stem and the broadened base portion, and a relatively large wastage of material and lack of economy in the process of manufacture. In order to permit the drilling of the long opening through the blank, it is necessary to use a considerable amount of lead, in the alloy of which the piece of bar stock is composed, and this results in a lessening of the tensile strength of the material. Also, when a piece of solid stock is headed, a considerable flow of metal is necessary in the central part of the head. This causes a hardening of the metal at this point, which renders it more or less brittle and, therefore, more easily broken.

In my improved process, the valve stem is made from a piece of tubular stock, the original tube opening being retained during the process of manufacture, so that the long drilling operation, necessary in past methods, is dispensed with. Moreover, in heading a piece of tubular stock, the wall of the tube can be folded upon itself in such a way that much less flowing of the metal is necessary to accomplish the heading operation, and the material is not rendered brittle and hard. It will also be obvious that my method is more economical, in that there is little wastage of material, and the operations required are more or less simple and may be performed at relatively small expense by machine work.

One object of my invention, therefore, is to obviate the disadvantages noted above in prior process, and produce a valve stem which shall possess greater tensile strength than those heretofore made, and which will, at the same time, be economical to manufacture.

Another object of my invention is the provision of a valve stem which may be made cheaply and without undue wastage of material, and which will, at the same time, possess all of the advantages of, and be superior to, articles of this kind now in use.

A still further object of my invention is to provide a new and improved method for manufacturing valve stems or articles of like character, which shall be more economical than the methods heretofore used, and which will produce an article of superior quality.

To these and other ends, the invention consists in the novel features and combinations of steps to be hereinafter described and claimed.

In the accompanying drawings:

Fig. 1 is a side elevational view of a valve stem embodying my improvements;

Fig. 2 is an enlarged sectional view of the same;

Fig. 3 is a top plan view of the valve stem shown in Fig. 2;

Fig. 4 comprises two side elevational views, taken at right angles to each other, of a piece of flat-sided tubular stock, from which the valve stem is made by my improved method, and an end view thereof;

Fig. 5 is a view showing one of the heading operations;

Fig. 6 is a view similar to Fig. 5, showing the completion of the heading operation;

Fig. 6ª is a fragmentary view of a punch of modified form.

Fig. 7 is an elevational view, partly in section, showing the rolling operation by which the annular, inwardly extending displacement upon the tube wall is made;

Fig. 8 is a section on line 8—8 of Fig. 7;

Fig. 9 is an elevational view, showing the succeeding step in the process of manufacture;

Fig. 10 is an elevational view, showing the tools by which the end of the blank is reduced in diameter by a series of swaging operations, looking in the direction of the arrows 10—10 on Fig. 11.

Fig. 11 is a sectional view on line 11—11 of Fig. 10;

Fig. 12 is an elevational view, showing the necking operation, by which the annular recess is cut in the body of the stem, adjacent the base.

The particular valve stem which I have shown in the drawings, as produced by my improved method, comprises a tubular body portion 10 provided with flat sides 11, and joining a relatively broad disc-like base 12 by a reduced portion or neck 13, formed by an annular exterior groove upon the body portion adjacent the base. At the upper end, the body 10 is reduced in size and threaded, as at 14, to receive the usual valve cap, and the body is also threaded continuously of its length, as at 15, in order that a dust cap may be secured thereto.

The bore of the stem is reduced at 16 by the provision of an annular shoulder at this point, which shoulder is designed to seat the spring holder of a common type of tire valve (not shown). Adjacent the upper reduced end, the tube opening is bored out to provide a seat 17, usually in the shape of a frustum of a cone, for a valve seating member, and above this seat, the bore is threaded, as at 18, to provide for the securing of the valve within the stem.

According to the preferred embodiment of my method which I have chosen to illustrate and describe, the valve stem is formed from a tubular piece of stock, as shown at 20 in Fig. 4, provided with the flat sides 21. After a proper length of this stock has been cut off from a long tube, the length is headed up by any desired method, in order to provide the base portion, shown at 12 in Fig. 1. I prefer to perform this heading operation by means of a heading press, such as shown in Figs. 5 and 6, although it will be obvious that the particular tools employed are not of importance in all aspects of the invention. The press shown may be termed a double-stroke header press, and comprises a die bed 22 supporting a die 23, provided with a die opening 24, having a counter-sunk portion 25 at the upper surface of the die. To the ram 26 are secured the two punches 27 and 28, which are brought down successively upon the blank to perform the complete heading operation. The blank is placed in the die opening 24, where it will seat upon a shoulder 29 in the lower portion of the die opening, and the punch 27 is brought down upon its upper end. The wall of the tube at this end will be doubled over to some extent, as shown in Fig. 5, and at the second stroke of the press, which operates to bring the punch 28 down upon the work, the heading operation will be completed, as shown in Fig. 6. The counter-sunk portion 25 of the die is provided with annular serrations or grooves 30 to form complementary serrations 31 in the base of the valve stem. These heading operations serve also to thicken the tube wall adjacent the base, as shown at 32 in Fig. 6, which, as will be explained hereinafter, is an advantageous feature of my improved process. It will be noted that when the wall is thickened, the outer diameter of the piece of stock remains unchanged, the metal being caused to flow inwardly, resulting in a reduction, to some extent, in the size of the tube bore. After the heading operation has been completed, the blank may be removed from the press by means of the knock-out punch 33.

Although the precise order of the steps performed may be varied without departing from the principles of the invention, I prefer to form the shoulder or annular projection 16 after the blank has been headed. While this operation may be performed in other ways, I have chosen to illustrate, for this purpose, a rolling press, shown in a fragmentary way in Fig. 8, consisting of a pair of opposing dies 35 and 36, having the ribs 37 and 38 formed thereon. As shown in Fig. 7, the headed blank is placed between these two dies in a vertical position, the end of the blank opposite the head being supported upon the bed 39 of the machine. The die 36 is then given a sliding reciprocatory motion relative to the die 35, which results in an annular channel or groove being rolled into the exterior surface of the blank by the ribs 37 and 38, as shown more particularly at 40 in Fig. 7. It will be seen that this operation results in the entire wall being displaced inwardly at this point, so that an annular projection or shoulder is formed in the tube bore, corresponding with the annular groove upon the exterior thereof.

In order to have a substantially smooth exterior surface, which is desirable upon the finished article, it is now necessary to close up the groove, which has been formed by the operation just described, and for this purpose, the blank may be placed upon a die 41, resting upon the bed 42 of a die press, with which a punch 43 is adapted to cooperate. The body of the blank may be surrounded by a sleeve 44, in order to prevent any distortion of the blank, and the punch 43 is brought down upon the base 12. As shown in Fig. 9, this operation results in the closing together of the walls of the groove 40, with the result that the exterior surface of the body of the blank is substantially continuous and smooth, the annular projection, however, still remaining within the tube bore. Preferably, the length of the sleeve 44 is such that when the punch 43 is at the downward limit of its stroke, there will be a slight clearance between the lower surface of the base 12 and the upper end face of the sleeve, so that the configuration of this face of the base will not be changed. The blank may then be removed from the press by means of the knock-out punch 45.

It is now necessary to reduce the exterior diameter of the blank adjacent the upper end thereof, and a preferred method of accomplishing this result is by means of successive swaging operations, illustrated in Figs. 10 and 11 of the drawings. The particular swaging machine shown consists of a pair of reciprocably mounted swaging dies 47 and 48 slidable in guides 49 and 50, and provided with complemental openings or seats shown at 51, 52, and 53, these openings being progressively smaller in diameter, so that the end of the blank will be progressively reduced in size as it is passed from one opening to the next. The dies may be brought together or reciprocated by any preferred means, and within the opening 51 may be provided a stop 54 to limit the insertion of the blank therein. Such a limiting means will not be necessary in the remaining die openings, as the shoulder, formed on the blank by the first swaging operation, will serve to limit its entrance into the succeeding openings. During this operation the blank may rest upon openings 55 in the frame of the machine.

The neck 13 may be provided by forming an annular recess upon the exterior of the stem body adjacent the base, by means of a suitable milling or cutting tool 56, shown more or less diagrammatically in Fig. 12. It will be noted from an inspection of Fig. 2, that due to the thickening of the wall during the heading process, sufficient metal may be cut away to provide this neck without diminishing the thickness of the wall at this point, beyond that of the rest of the tube. In other words, notwithstanding the fact that the exterior diameter of the tube is reduced at this point, the wall is of substantially the same thickness as that of the remainder of the tube, due to the reduction of the tube bore during the heading operation.

Due to the fact that the tube bore at the upper end of the stem body has been considerably reduced in diameter during the swaging operation, illustrated in Figs. 10 and 11 of the drawings, it is necessary to enlarge this opening by a drilling or boring operation, in order that it may be sufficiently large to receive the usual tire valve. This operation may now be brought about in any of the usual well known ways, and the seat 17 provided for the valve seat member. The bore just described is then threaded interiorly, as at 18, and the exterior threads 14 are cut upon the reduced end of the stem, thus completing the process of manufacture and the stem is ready for use.

In Fig. 6ª, I have shown a punch 60 of modified form which may, if desired, be used in place of the punch 28 to complete the heading operation. This punch is provided with a pin 61 which, when the punch is brought down upon the tube, enters the tube bore and positively preserves the tube opening by preventing the metal from being caused to flow inwardly at this point to a sufficient extent to close the opening. When the punch 28 is used, which punch is not provided with a centering pin, the opening through the tube is preserved by gauging the length of the upper end of the tube, which projects from the openings in the die 23 to be acted upon and folded by the punches 27 and 28. It will be obvious that if the proper amount of metal is left to project from the die, a satisfactory and strong head may be formed upon the blank, without entirely closing the opening in this head. However, when the punch 60 is used, the length of the tube which projects from the die opening need not be so carefully gauged, as the pin 61 will prevent the closing of this opening, and will force outwardly into the tube head any metal which would otherwise tend to flow inwardly to close the opening.

It will be apparent that my improved process for the manufacture of articles such as described consists of comparatively few operations, which may be cheaply performed, and results in an article which is superior to that manufactured by prior methods. While I have shown and described a preferred method of carrying out my invention, it will be understood that the same is not to be limited to all the details shown, or to the precise steps described, or to the means described for carrying out the various steps, but, on the other hand, the method is capable of modification and variation without departing from the spirit of the invention or from the scope of the appended claims.

What I claim is:

1. The process of making a valve stem or like article, which comprises folding over a wall of a blank in the form of a piece of tubular stock of uniform diameter throughout its length adjacent one end thereof to form a flat disklike head and simultaneously flowing the metal of the blank inwardly adjacent the head to form a thickened wall, while limiting the movement of the metal into the bore of the blank to preserve the opening therethrough.

2. The process of making a valve stem or like article, which comprises folding over the wall of a blank in the form of a piece of tubular stock of uniform diameter throughout its length, adjacent one end thereof, to form a flat disc-like head, while preserving the tube opening in said headed portion, and reducing the exterior diameter of the other end of the blank to form an upper neck.

3. The process of making a valve stem or the like, which comprises forming a flat disklike head upon a blank in the form of a piece of tubular stock of uniform diameter throughout its length by folding over upon itself the wall adjacent one end thereof against a stop member within the bore of the blank, so as to prevent the closing of the bore during the heading operation, and simultaneously flowing the metal of the blank inwardly adjacent the head to form a thickened portion at this point.

4. The process of making a valve stem or the like, which includes the step of folding over upon itself the wall of a piece of tubular stock of uniform diameter throughout its length, adjacent one end thereof, to form a flat disc-like head, comprising a plurality of layers of material, simultaneously flowing the metal of the tubular stock inwardly adjacent the head to form a thickened portion at this point while preserving the tube opening in said headed portion, forming an exterior annular recess at the point so thickened and displacing the metal of the stem inwardly at an intermediate point to form an interior annular shoulder.

5. The method of making a valve stem or the like from a piece of tubular stock, which comprises forming a flat disk-like head on said stem and flowing the metal adjacent the head to thicken the tube wall, and then cutting an annular recess in the stem at the point so thickened.

6. The method of making, from a piece of tubular stock, a valve stem or the like, having a disc-like head joining the stem body by a narrow neck, which comprises thickening interiorly the wall of the tube adjacent the head, and then cutting an exterior annular recess at the point so thickened.

7. The method of making a valve stem or the like, which comprises cutting from a piece of flat-sided, tubular stock a blank of the desired length, and forming a circular, disk-like base on one end of the blank by folding over the wall thereof against a stop member in the bore of the blank to limit the inward movement of the metal of the wall.

8. The method of making a valve stem or the like, which comprises heading one end of a piece of tubular stock and simultaneously thickening the tube wall adjacent the formed head, and then cutting an exterior groove in the blank at said thickened portion.

9. The method of making a valve stem or the like, which comprises heading one end of a piece of tubular stock and simultaneously thickening the tube wall adjacent the formed head by an inward flowing of the metal at this point, and then cutting an annular exterior groove upon said thickened portion of the blank.

10. The method of making a valve stem or the like from a piece of tubular stock, which comprises forming a flat disk-like head on said stock and displacing inwardly the wall adjacent the head, in order to thicken the wall at this point, and, at the same time, preserving the tube opening at the point so thickened, and then cutting an exterior groove at the thickened portion of the wall.

11. The method of making a valve stem or the like, which comprises displacing inwardly the wall of a piece of tubular stock, by forming an external, annular groove therein, and then closing together the walls of said groove.

12. The method of making a valve stem or the like, which comprises displacing inwardly the wall of a piece of tubular stock by forming an external, annular groove therein, and then placing said blank in a suitable sleeve to prevent the distortion thereof, and closing together the walls of said groove by applying pressure to opposite ends of the blank.

13. The method of making a valve stem or the like, from a piece of tubular stock, which comprises folding over upon itself the wall adjacent one end thereof against a stop member within the bore of the blank to form a disk-like head, while simultaneously flowing the metal of the blank inwardly adjacent the head to form a thickened portion, forming an annular groove in the portion so thickened, displacing the tube wall inwardly at a point intermediate the ends of a blank to form an annular interior shoulder, and displacing the tube wall inwardly at one end of the blank to reduce the exterior dimensions thereof, said last named displacement also causing a reduction in the diameter of the tube bore, at that end thereof, and then enlarging the tube bore at this point for the purpose described.

14. The method of making a valve stem which comprises displacing the wall at one end of a tube to form an integral head, forming an exterior groove in the tube intermediate its ends, so as to create an inwardly projecting shoulder for seating a valve spring, and compressing the blank to close up, at least partially, the exterior groove.

15. The method of making a valve stem which comprises displacing the wall at one end of a tube to form an integral head, forming an exterior groove in the tube intermediate its ends, so as to create an inwardly projecting shoulder for seating a valve spring, and compressing the blank to close up, at least partially, the exterior groove, and reducing the upper end of the blank by swaging.

In witness whereof, I have hereunto set my hand on the 21st day of February, 1923.

ERASTUS G. OAKLEY.